(12) United States Patent
Kawakami et al.

(10) Patent No.: US 8,638,292 B2
(45) Date of Patent: Jan. 28, 2014

(54) TERMINAL APPARATUS, DISPLAY CONTROL METHOD, AND DISPLAY CONTROL PROGRAM FOR THREE DIMENSIONAL PERSPECTIVE DISPLAY

(75) Inventors: Takashi Kawakami, Tokyo (JP); Hiroyuki Kawakami, Kanagawa (JP); Kenta Ohmori, Tokyo (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 732 days.

(21) Appl. No.: 12/629,928

(22) Filed: Dec. 3, 2009

(65) Prior Publication Data
US 2010/0079371 A1   Apr. 1, 2010

(30) Foreign Application Priority Data
Dec. 5, 2008  (JP) .............................. P2008-310672

(51) Int. Cl.
*G06F 3/048* (2013.01)
(52) U.S. Cl.
USPC .......................................................... 345/156
(58) Field of Classification Search
None
See application file for complete search history.

(56) References Cited

U.S. PATENT DOCUMENTS

| | | | |
|---|---|---|---|
| 6,009,210 A * | 12/1999 | Kang .............................. | 382/276 |
| 6,351,273 B1 * | 2/2002 | Lemelson et al. ............ | 715/786 |
| 2006/0164382 A1 * | 7/2006 | Kulas et al. ................... | 345/156 |
| 2008/0062141 A1 * | 3/2008 | Chandhri ....................... | 345/173 |
| 2009/0177989 A1 * | 7/2009 | Ma et al. ........................ | 715/766 |
| 2009/0271734 A1 * | 10/2009 | Hsu et al. ....................... | 715/785 |
| 2009/0313584 A1 * | 12/2009 | Kerr et al. ...................... | 715/849 |
| 2010/0064259 A1 * | 3/2010 | Alexanderovitc et al. .... | 715/852 |

FOREIGN PATENT DOCUMENTS

| | | | |
|---|---|---|---|
| JP | 2002099386 A | * | 4/2002 |
| JP | 2003 108980 | | 4/2003 |
| JP | 2005 284487 | | 10/2005 |
| JP | 2007 260232 | | 10/2007 |
| WO | WO 01/88679 A2 | * | 11/2001 |

OTHER PUBLICATIONS

English machine translation of JP 2002099386 A (Masayoshi Ishida, Image Display Control System, published Apr. 2002).*

* cited by examiner

*Primary Examiner* — Will J Klimowicz
*Assistant Examiner* — Mark Fischer
(74) *Attorney, Agent, or Firm* — Frommer Lawrence & Haug LLP; William S. Frommer; Ellen Marcie Emas

(57) ABSTRACT

A terminal apparatus includes a display displaying a plurality of display elements representing options on a display screen, an image-capturing section capturing an image of an operator who is viewing the display screen, a face position detector detecting the position of a facial image of the operator in a captured image, and a controller controlling the display to move the plurality of display elements in a predetermined direction on the display screen and to sequentially update and display the display elements when it is detected that the facial image of the operator in the captured image is outside of a predetermined range, and to stop the movement of the plurality of display elements when it is detected that the facial image falls within the predetermined range.

13 Claims, 21 Drawing Sheets

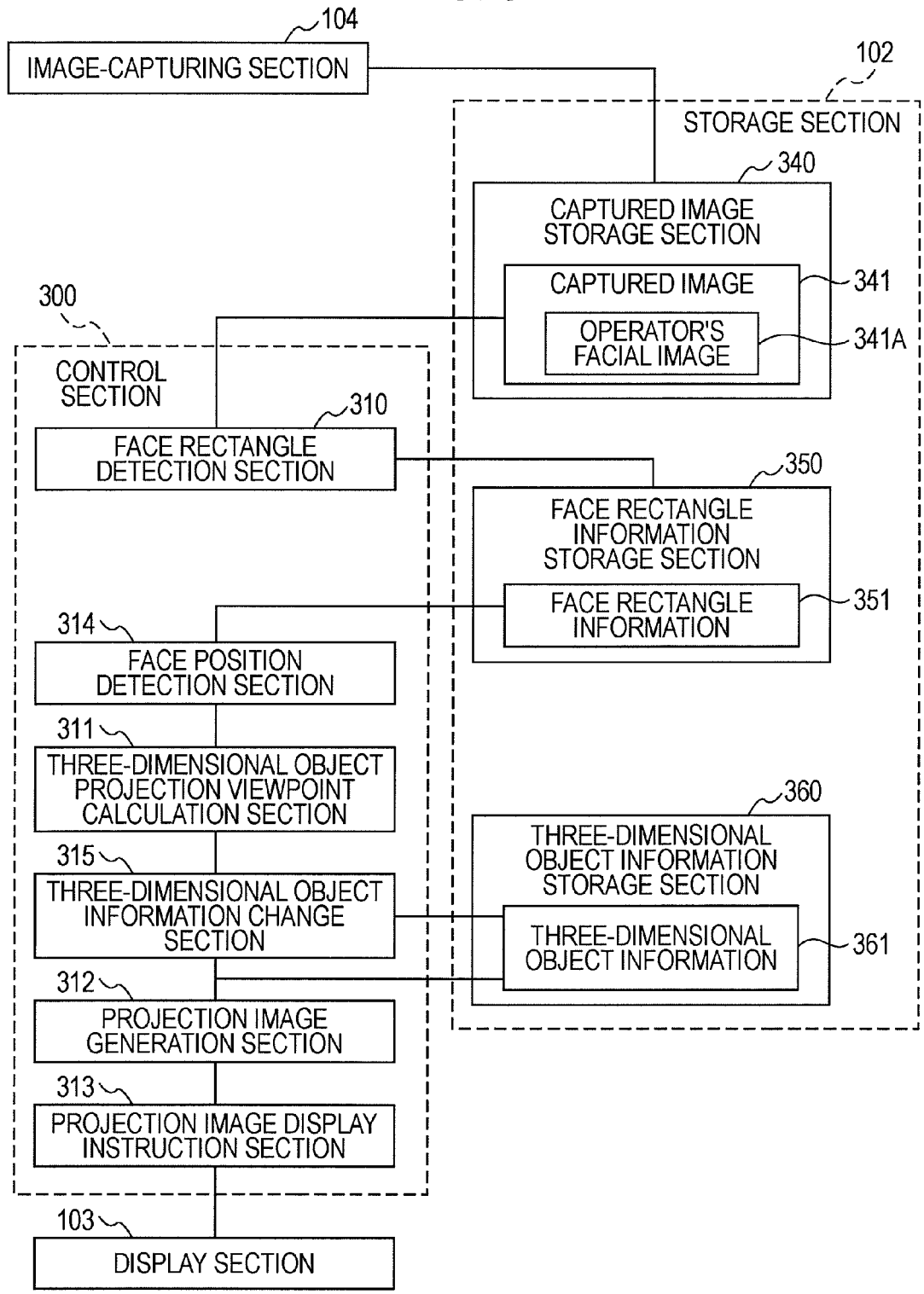

FIG. 4A
FIG. 4B
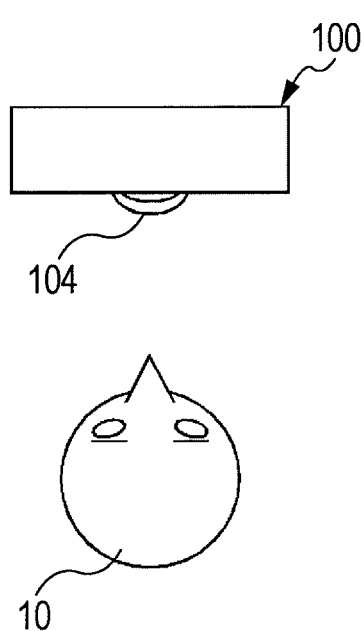
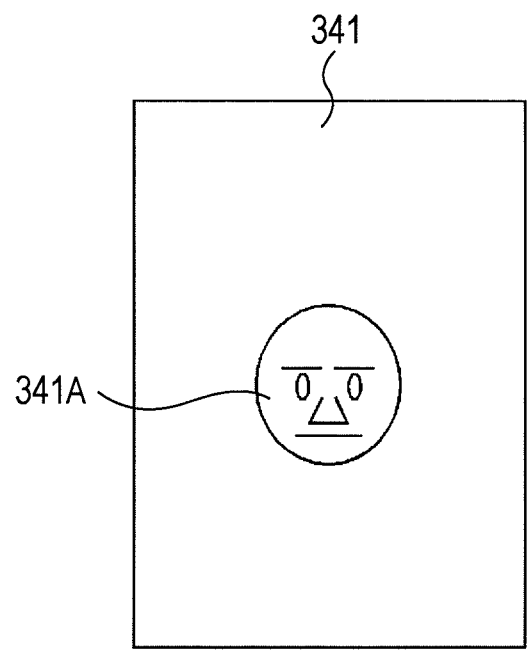

FIG. 5A
FIG. 5B
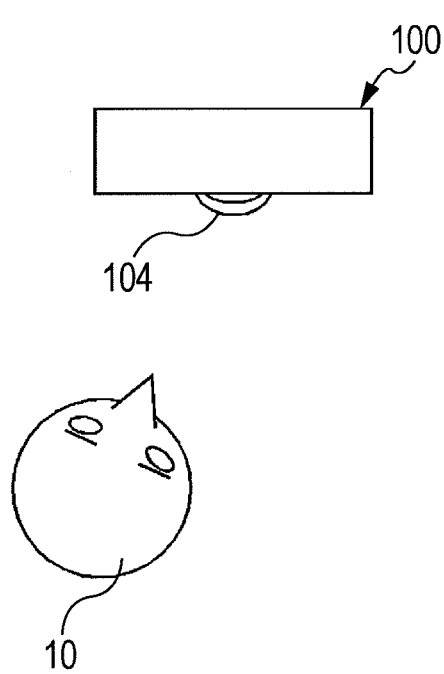
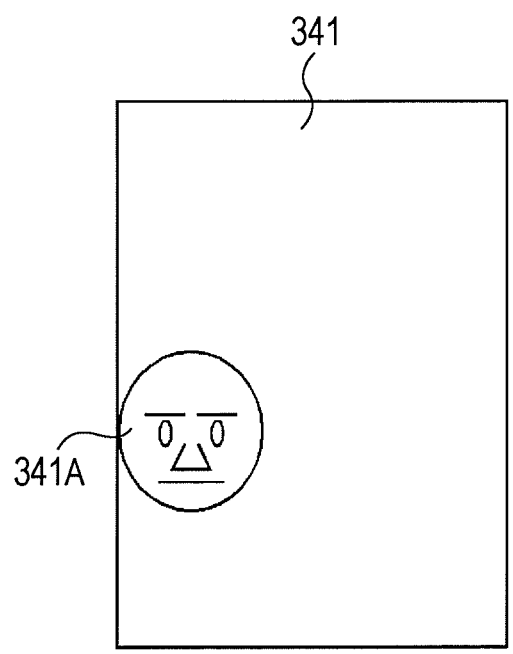

OPERATOR'S INTER-EYE DISTANCE

FIG. 13A
FIG. 13B
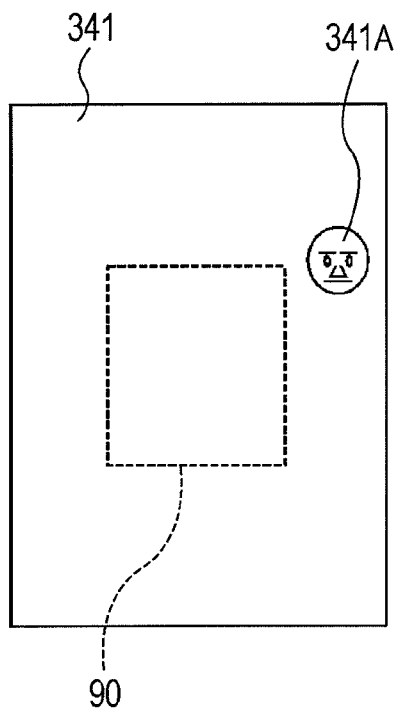
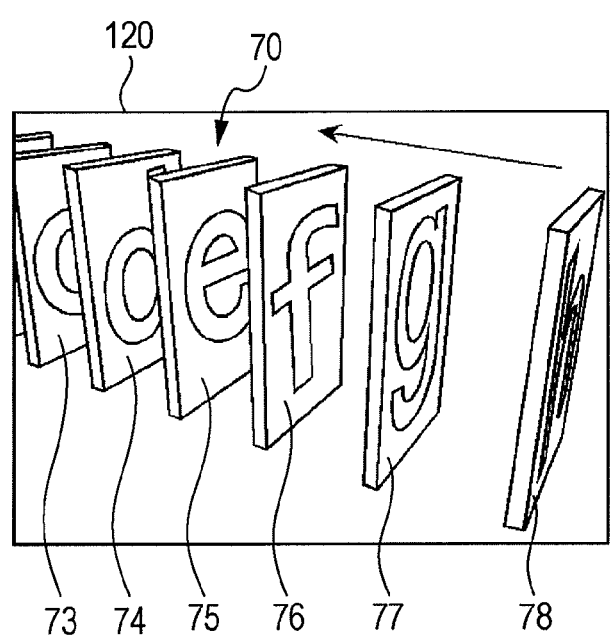

FIG. 18A
FIG. 18B
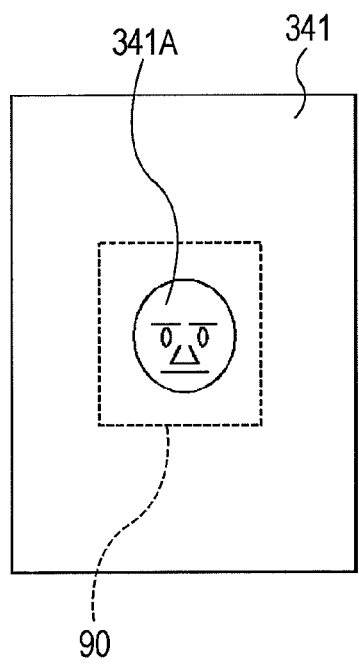
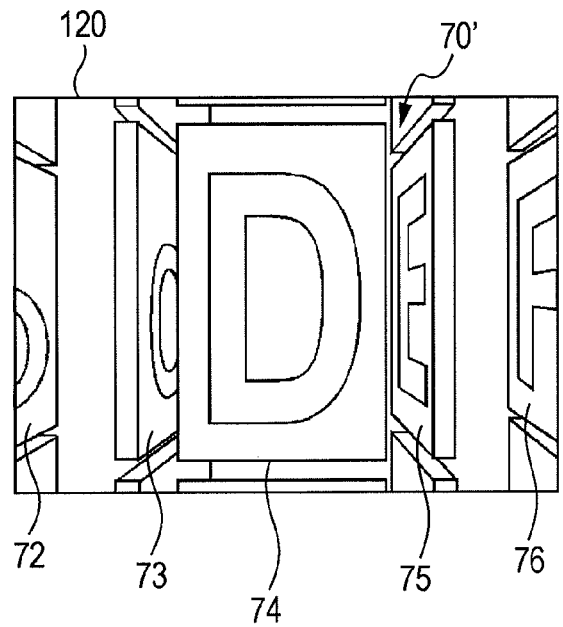

TERMINAL APPARATUS, DISPLAY CONTROL METHOD, AND DISPLAY CONTROL PROGRAM FOR THREE DIMENSIONAL PERSPECTIVE DISPLAY

BACKGROUND OF THE INVENTION

1. Field of the Invention

The present invention relates to a terminal apparatus which displays a projection image of a three-dimensional object on a two-dimensional display screen, a display control method, and a display control program.

2. Description of the Related Art

A related art terminal apparatus displays a projection image of a three-dimensional object on a display device. A three-dimensional object is displayed so as to enable an operator to manipulate the three-dimensional object, so that convenience and the ability to view at a glance are improved.

A technique has been suggested which enables display control, such as changing the viewpoint of a projection image of the three-dimensional object on the display screen by the operation of a controller (see Japanese Unexamined Patent Application Publication No. 2007-260232). The operation of the controller is not simply limited to the operation of a push button, but a change in the position or posture of the controller may be measured and used.

A technique has been suggested in which, for the purpose of video telephones communicating character videos, by transmitting video of a CG character, instead of the face of a person, to a contact, information regarding the operator's head posture and facial expression is measured, and the motion of the CG character is controlled on the basis of the measurement result (See Japanese Unexamined Patent Application Publication No. 2003-108980).

A technique has also been suggested in which a facial image is rapidly determined from captured images with a small amount of calculation (see Japanese Unexamined Patent Application Publication No. 2005-284487).

SUMMARY OF THE INVENTION

With the display and manipulation of the three-dimensional object described above, the sense of realism of display can be expected to be increased.

In a mobile object terminal, such as a mobile phone, which has a comparatively small display screen and limited input means, a method is used in which, when a desired object for selection is selected from among a comparatively large number of objects for selection, objects for selection are displayed in the form of a list or icons, and an operator operates a cross key or the like to move a cursor or a focus with respect to the list or icons and to select an object for selection.

However, in order to select a desired object for selection from among multiple objects for selection, it is necessary to manually perform an operation to scroll the objects thr selection on the display screen or to switch pages. The manual operation of an operating section while viewing the screen until a desired object for selection is visible becomes complicated and makes the operating section too hard to use for a beginner who is unused to such operation.

It is desirable to easily perform selection of multiple objects for selection without manual operation by an operator.

It is also desirable to provide a novel display method which enables at-a-glance easy understanding and selection of multiple objects for selection on a limited size display screen. (It should be sufficient that the invention achieves one of these tasks.)

A terminal apparatus according to an embodiment of the invention includes display means for displaying a plurality of display elements representing options on a display screen, image-capturing means for capturing an image of an operator who is viewing the display screen, face position detection means for detecting the position of a facial image of the operator in a captured image, and control means for controlling the display means to move the plurality of display elements in a predetermined direction on the display screen and to sequentially update and display the display elements when it is detected that the facial image of the operator in the captured image is outside of a predetermined range, and to stop the movement of the plurality of display elements when it is detected that the facial image falls within the predetermined range.

With this embodiment, the position of the facial image of the operator can be detected with respect to the image-capturing means and consequently the display screen by the image-capturing means for capturing the image of the operator who is viewing the display screen and the face position detection means, and an operation to move a plurality of display elements or to stop the movement is performed in accordance with the detected position. As a result, a so-called hands-free operation is realized.

The control means may change the distance between the viewpoint and the card group in accordance with the size of the facial image. With this configuration, when a display element is displayed three-dimensionally, display is realized as if the operator actually approaches or moves away from the display element.

Another embodiment of the invention provides a display control method and a display control program for a terminal apparatus including a display section displaying a plurality of display elements representing options on a display screen, and an image-capturing section capturing an image of an operator who is viewing the display screen. The method includes and the program causes a computer to execute the steps of detecting the position of a facial image of the operator in an image captured by the image-capturing section, determining whether or not the facial image of the operator in the captured image is outside of a predetermined range, when it is detected that the facial image is outside of the predetermined range, moving the plurality of display elements in a predetermined direction on the display screen, and sequentially updating and displaying the display elements, and, when it is detected that the facial image falls within the predetermined range, controlling the display section to stop the movement of the plurality of display elements and to highlight a display element at a specific position at the present time.

According to the embodiments of the invention, the operator can perform input to the terminal apparatus hands-free by simple and intuitive means, for example, by changing the face position. Further, a three-dimensional image which seems to be visible from the position of the operator is projected and displayed on the display screen of the terminal apparatus, so the operability of a user interface when an option is selected by the terminal apparatus can be increased and the sense of realism can be improved.

BRIEF DESCRIPTION OF THE DRAWINGS

FIG. 3 is a functional block diagram showing the main functions of a mobile object terminal according to an embodiment of the invention.

FIGS. 4A and 4B are diagrams showing an example of the relationship between a captured image and an operator's facial image in the captured image according to an embodiment of the invention.

FIGS. 5A and 5B are diagrams showing another example of the relationship between a captured image and an operator's facial image in the captured image according to an embodiment of the invention.

FIGS. 13A and 13B are diagrams showing the position of an operator with respect to an image-capturing section (or display screen) and a display example on the display screen at the present time according to an embodiment of the invention.

FIGS. 18A and 18B are diagrams showing an example of highlight display corresponding to the example of FIGS. 17A and 17B.

DESCRIPTION OF THE PREFERRED EMBODIMENTS

Hereinafter, a preferred embodiment of the invention will be described in detail with reference to the drawings.

Figure 1:
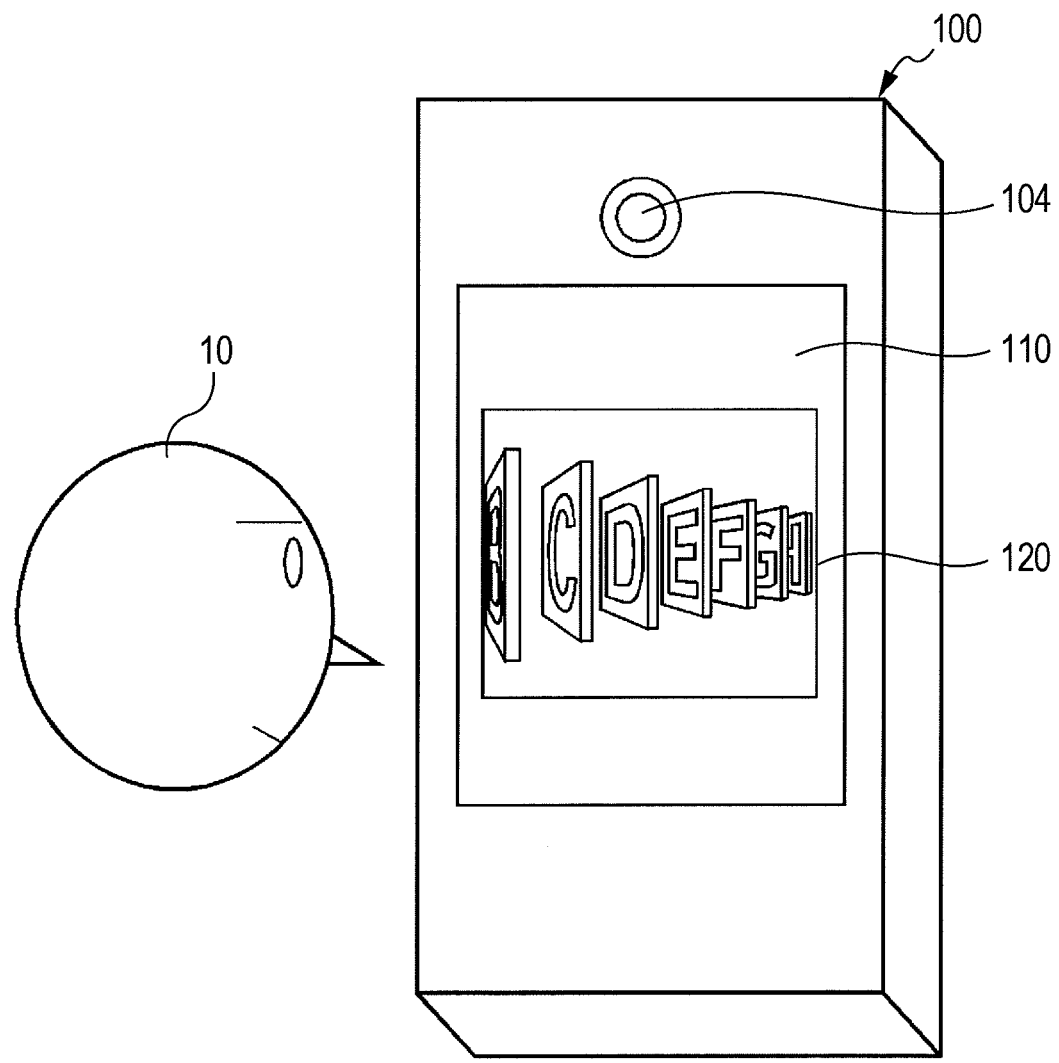
FIG. 1 is a diagram showing the schematic configuration of a mobile object terminal according to an embodiment of a terminal of the invention.

FIG. 1 shows the schematic configuration of a mobile object terminal 100 according to an embodiment of a terminal of the invention. The mobile object terminal 100 is, for example, a mobile phone terminal.

The mobile object terminal 100 displays a plurality of options which are selectable by an operator, that is, a plurality of objects for selection on a display screen 110 as a projection image 120 of a three-dimensional object. An image of the face (facial image) of the operator (that is, the user) 10 who is viewing the display screen 110 is obtained by an image-capturing section 104. The image-capturing section 104 corresponds to a device, such as a digital camera, which captures an image of an operator who is viewing the display screen. The image-capturing section 104 may be an image-capturing section which is rotatably provided on the operator so as to image a subject in front of the operator, or may be another image-capturing section which is provided separately from such an image-capturing section and the lens of which fixedly faces the operator for video telephoning or the like. Though not shown in FIG. 1, an operating section is provided which has various operation keys provided in a mobile phone terminal or the like. The type of the terminal is not particularly limited, and a folding type, a sliding type, a flat type, or the like may be used.

Figure 2:
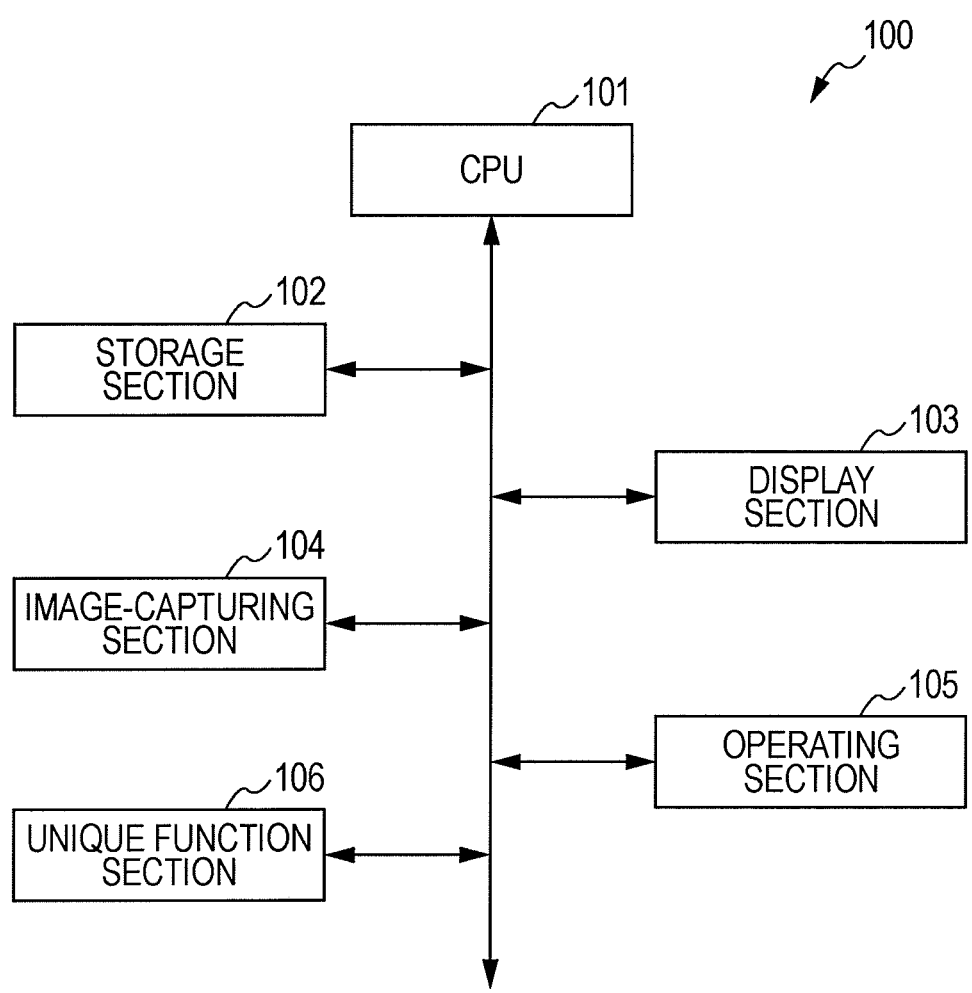
FIG. 2 is a diagram showing the schematic hardware configuration of the mobile object terminal shown in FIG. 1.

FIG. 2 shows a schematic hardware configuration of the mobile object terminal 100 shown in FIG. 1.

The mobile object terminal 100 includes a CPU 101, a storage section 102, a display section 103, the image-capturing section 104, an operating section 105, and a unique function section 106.

The CPU 101 is a part constituting control means of the invention, and executes various programs including a system program of a terminal apparatus and a display control program of the invention to control the entire mobile object terminal 100 and to execute various processes.

The storage section 102 stores a program to be executed by the CPU 101 and necessary data, and includes a detachable recording medium as well as internal storage devices, such as a ROM, a RAM, a flash memory, an HDD, and the like. Below-described three-dimensional object information and captured image information obtained by the image-capturing section are also stored in the storage section 102.

The display section 103 displays the projection image 120 of the three-dimensional object or the like on the display screen 110 shown in FIG. 1, and includes a display device, such as an LCD, an organic EL, or the like.

The image-capturing section 104 is image-capturing means capable of capturing an image of the face of the operator 10, as described with reference to FIG. 1.

The operating section 105 receives an input operation of the operator, as described with reference to FIG. 1.

The unique function section 106 performs a unique function of an individual mobile object terminal. For example, one or more of a music player, an image player, a motion image player, a GPS function section, a non-contact IC function section, and the like are provided.

A wireless communication section, a vibration generation section, an LED light-emitting section, a power supply section, and the like provided in a typical mobile phone terminal are not shown.

FIG. 3 is a functional block diagram showing the main functions of the mobile object terminal 100 according to this embodiment.

The control section 300 constitutes a face rectangle detection section 310, a three-dimensional object projection viewpoint calculation section 311, a projection image generation section 312, a projection image display instruction section 313, a face position detection section 314, and a three-dimensional object information change section 315.

The storage section 102 is provided with a captured image storage section 340 storing a captured image 341 (including an operator's facial image 341A) obtained by the image-capturing section 104, a face rectangle information storage section 350 storing face rectangle information 351 obtained on the basis of a captured image, and a three-dimensional object information storage section 360 storing three-dimensional object information 361 indicating the three-dimensional structure of the three-dimensional object. The three-dimensional object information 361 includes the shape, position, color, and the like of the three-dimensional object that is to be output to the display section. In this embodiment, a collection (group) of card-shaped display elements of the same size having a front surface and a rear surface displaying objects for selection is defined as the three-dimensional object. The display elements correspond to icons or selection buttons indicating objects for selection constituting options on a user interface.

The face rectangle detection section 310 constructed by the control section 300 detects a rectangle (for example, a rectangle including both eyes, and a nose, or the like) corresponding to the face or the operator in a captured image 341 obtained by the image-capturing section 104, and obtains face rectangle information 351. The face rectangle information 351 is information regarding the coordinates of a predetermined point (for example, an upper left point) of the face rectangle, the width and height of the face rectangle, and the like. Instead of the width and height, the coordinates of a diagonal point of the face rectangle may be used.

As the method of detecting the face rectangle, the technique described in Japanese Unexamined Patent Application Publication No. 2005-284487 may be used. For example, a lot of information regarding the face is prepared in advance, and dictionary data for face detection is constructed. Next, the input captured image 341 is compared with information stored in the dictionary for face detection while the image is being enlarged or reduced and similar portions are repeatedly determined so as to detect the face rectangle. With this method, the facial elements, such as both eyes, a nose, a mouth, and the like can be extracted from the captured image 341, and the positions of the facial elements, and consequently, the face region, expression, and the like can be detected at high speed as face rectangle information. The position or distance of the face of the operator with respect to the image-capturing section 104 as well as changes in the position or distance are reflected in the face rectangle information, as described below.

The three-dimensional object projection viewpoint calculation section 311 calculates the position of a three-dimensional object projection viewpoint with respect to the three-dimensional object on the basis of the detected face rectangle information. For example, the angle and distance of the viewpoint where the three-dimensional object is projected on the two-dimensional plane as an image are calculated.

The face position detection section 314 detects the relative position of the face of the operator with respect to the display screen 110 from the position of a facial image 341A with respect to the captured image 341. The term "relative" means that movement of the face with respect to the stationary terminal is equivalent to movement of the terminal with respect to the stationary face.

The three-dimensional object information change section 315 updates three-dimensional object information so as to change the arrangement of the three-dimensional object in accordance with the change in the viewpoint position output from the three-dimensional object projection viewpoint calculation section 311. The update of three-dimensional object information includes changes in the positions of all the display elements, changes in the positions of some display elements, update of the display elements themselves (or changes in the allocation of the images of the front surface and the rear surface to the display elements), and the like.

The projection image generation section 312 generates a three-dimensional object projection image 120 by using the three-dimensional object information 361 in accordance with the viewpoint output from the three-dimensional object projection viewpoint calculation section 311. The three-dimensional object projection image 120 is a projection image obtained when the three-dimensional object is projected on a predetermined projection plane (the display screen or a virtual plane parallel to the display screen).

The projection image display instruction section 313 instructs the display section 103 to display the projection image generated by the projection image generation section 312 on the display screen.

The display section 103 displays an image in accordance with the instruction from the projection image display instruction section 313.

Figure 6A:
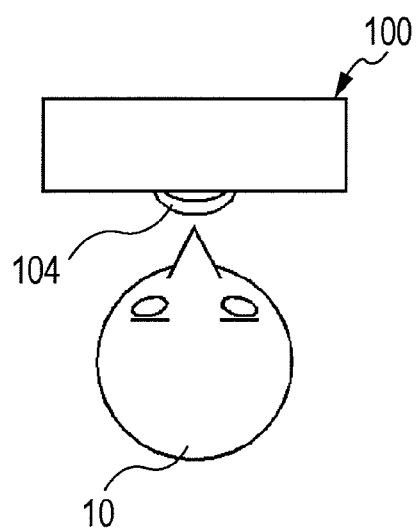
FIGS. 6A and 6B are diagrams showing another example of the relationship between a captured image and an operator's facial image in the captured image according to an embodiment of the invention.
Figure 6B:
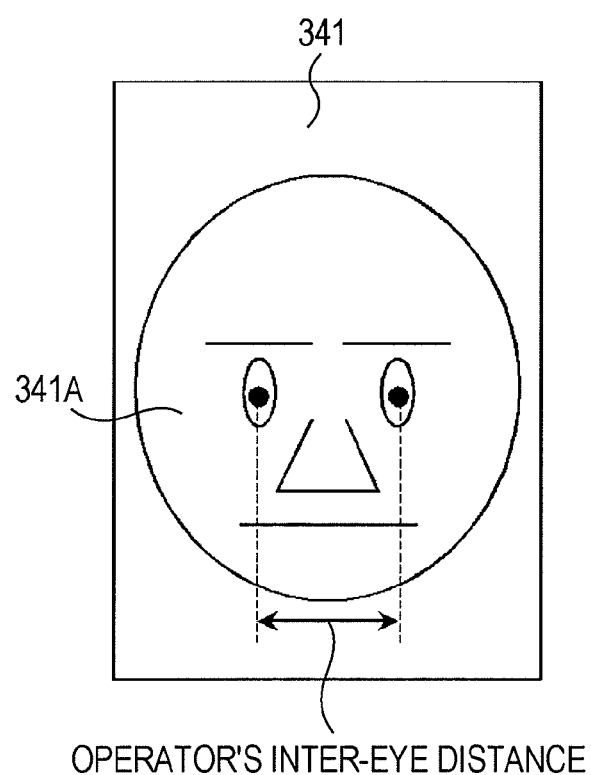

FIGS. 4, 5, and 6 show the relationship between the captured image 341 and the operator's facial image 341A in the captured image. Estimation of where the face of the operator actually is, is possible on the basis of the captured image 341 as will be described with reference to the relationships. FIGS. 4A, 5A, and 6A show the positional relationship between the portable terminal and the operator when viewed from above. FIGS. 4B, 5B, and 6B show the captured image 341 stored in the captured image storage section 340 in the situations of FIGS. 4A, 5A, and 6A, respectively. The face rectangle information is detected from the captured image 341 by an existing method, as described above.

Hereinafter, the method of estimating the face position of the operator according to the positional relationship between the captured image 341 and the face rectangle corresponding to the operator's facial image 341A will be described with reference to FIGS. 4A to 6B.

As shown in FIG. 4A, it is assumed that (the face of) the operator 10 is located in front of the display screen 110. In this case, as shown in FIG. 4B, the operator's facial image 341A in the captured image 341 is located at the center of the captured image 341. The display screen 110 and the image-capturing section 104 are misaligned, so even if the face is located in front of the display screen 110, the facial image in the image captured by the image-capturing section 104 may be misaligned from the center. In this case, the amount of misalignment of the facial image with respect to the captured image may be corrected.

As shown in FIG. 5A, when the operator 10 relatively moves left toward the display screen 110, the operator's facial image 341A in the captured image 341 is located toward the left side of the captured image, as shown in FIG. 5B. In the actual captured image, the operator's facial image 341A is located toward the right side of the captured image, but for convenience, the operator's facial image 341A is located together on the side where the face of the operator 10 shown in FIG. 5A is located. When the relative position of the facial image 341A with respect to the captured image 341 is calculated, a left-right inverted image of the captured image 341 is used or the position of the facial image 341A obtained from the captured image 341 is left-right inverted.

In this way, the position of the operator's facial image 341A in the captured image 341 is detected, so it can be determined the direction in which the operator 10 is located with respect to the image-capturing section 104 or the display screen 110 and, consequently, with respect to the mobile object terminal 100.

As shown in FIG. 6A, when the operator approaches the image-capturing section 104, the size (face size) of the operator's facial image in the captured image 341 (specifically, the inter-eye distance of the operator on the captured image) increases with respect to the captured image, as shown in FIG. 6B. Actually, if the relative size of the face size with respect to the captured image is detected by using a face detector, the distance of the operator with respect to the image-capturing section 104 can be determined. In other words, the change in the distance can be detected on the basis of the change in the face size. In this case, as the inter-eye distance which is the index of the face size, the width of the face rectangle may be used. Alternatively, the distance between the elements, such as a nose, a mouth, and eyebrows, constituting the face, may be used, or face size information may be obtained by using the size of the entire face in the captured image 341, and the distance may be determined on the basis of the face size information.

Figure 7A:
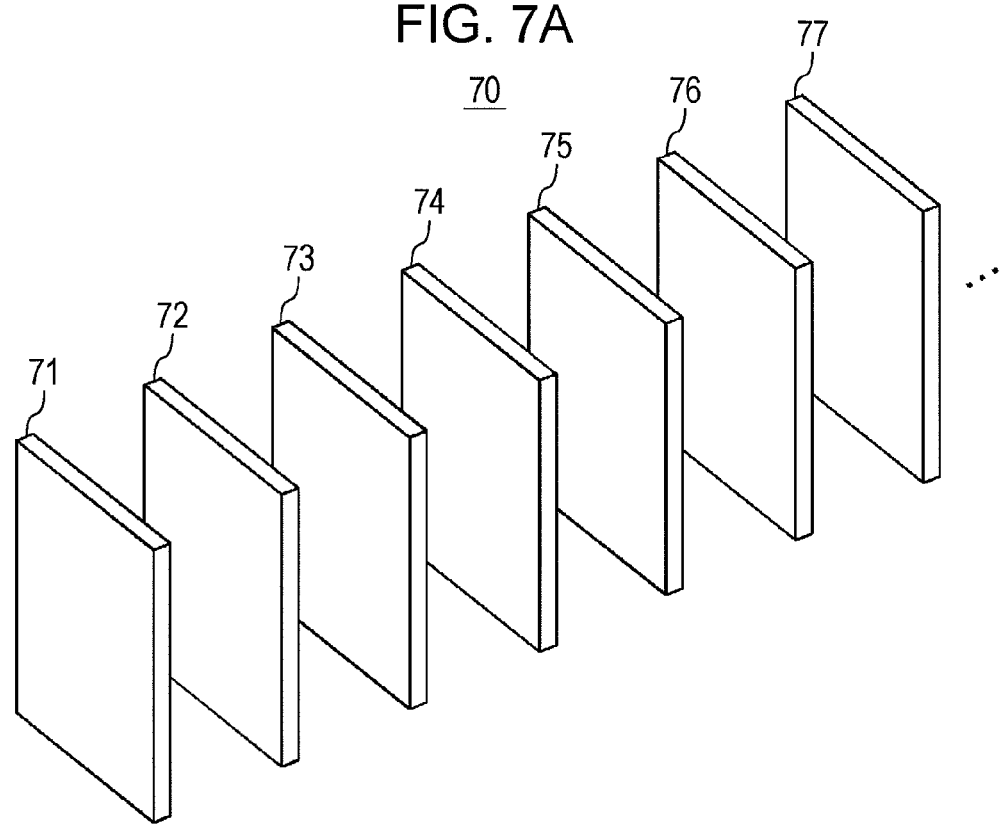
FIGS. 7A and 7B are a perspective view of a card group according to an embodiment of the invention, and a diagram showing a state where an object for selection is highlighted on the display screen.
Figure 7B:
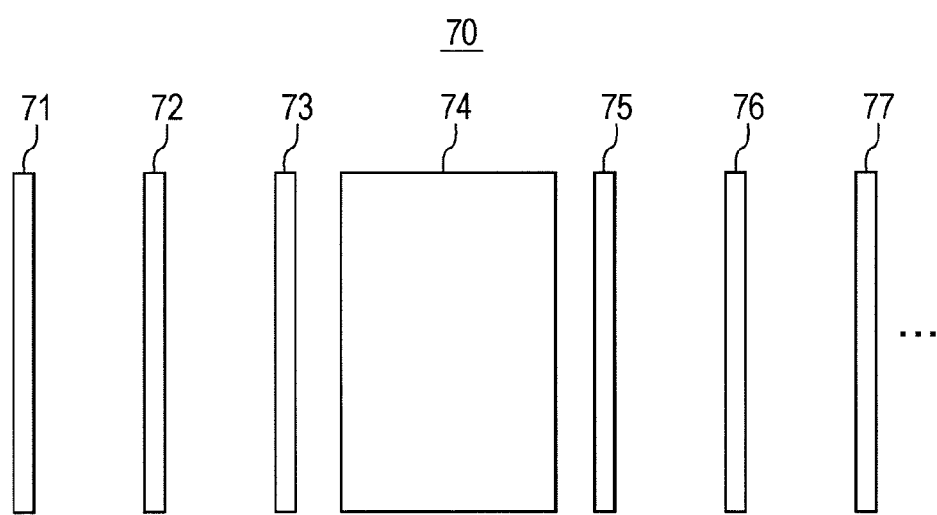

In this embodiment, it is assumed that, as an example of the three-dimensional object, card-shaped members of a predetermined size (in this specification, for convenience, called cards) are arranged in parallel at regular intervals (called a card group). FIG. 7A is a perspective view of a card group 70. Each card is associated with an object for selection. The arrangement as described below is the arrangement when the operator selects a desired object for selection, and the object for selection is moved and displayed. FIG. 7B shows a state where the operator selects one object for selection and the object for selection is highlighted. In the example of FIG. 7B, one surface of a card of the object for selection is arranged so as to face the front (operator side).

A specific operation example of this embodiment will now be described.

FIGS. 8A to 13B show the position of the operator with respect to the image-capturing section (or the display screen) and a display example at that time. With regard to such an operation, the operator moves his/her face with respect to the display screen (with respect to the image-capturing section) and a desired object for selection is selected from among multiple options. FIGS. 8A, 9A, 10A, 11A, 12A, and 13A show the relationship between the captured image and the operator's facial image. FIGS. 8B, 9B, 10B, 11B, 12B, and 13B show the example of the projection image 120 at that time. As described above, the options are expressed by card-shaped display elements of the same size having a front surface and a rear surface, and a plurality of cards are displayed in perspective view from a viewpoint where one surface of each card in a card group arranged in parallel at regular intervals in a three-dimensional space is partially visible. In this example, it is assumed that, as an example of the multiple options, jackets of music recording mediums, such as CDs (or music records) are used. The three-dimensional images of the jackets or cards attached with the images of the front and rear surfaces of the jackets on the front and rear surfaces thereof are used as card-shaped display elements. The invention is not particularly limited in terms of the thickness of the card, presence/absence, and the like. In the example of the drawings, for convenience of explanation, an uppercase alphabet character indicates a front surface image, and a lowercase alphabet character indicates a rear surface image. In this embodiment, a surface visible to the operator is switched to the front surface or the rear surface of the card in accordance with whether the facial image is located on one side or the other side of a threshold value boundary. When a surface of the card is visible to the operator, a configuration may be made such that the front surface is constantly visible.

In this embodiment, control and selection of the three-dimensional viewpoint position are performed simultaneously in accordance with the position of the operator's facial image in the captured image. Thus, the captured image 341 is used as follows.

(1) The three-dimensional viewpoint position is decided from the position of the operator's facial image in the captured image 341. In this case, the position of the operator's facial image includes the position when the operator moves from left to right or up and down while facing a lens section (not shown) of the image-capturing section, and the distance from the lens section to the face. As described above, the change in the distance can be determined by the change in the relative size of the operator's facial image 341A in the captured image 341. As the distance increases, the three-dimensional viewpoint position moves away from the three-dimensional object, and as the distance decreases, the three-dimensional viewpoint position approaches the three-dimensional object.

(2) It is determined whether or not the operator's facial image 341A on the captured image 341 is outside of the threshold value boundary 90 as a predetermined range set in advance in the captured image. The determination is performed, for example, in accordance with whether or not the center of the facial image is outside of the threshold value boundary 90. In the example of the drawings, the threshold value boundary 90 is a rectangle, but the shape of the threshold value boundary 90 is not limited to a rectangle. For example, a circle or a polygon may be used. The position of the threshold value boundary 90 is substantially the center of the captured image 341, but it may be slightly misaligned from the center of the captured image 341.

(3) When the operator's facial image 341A is outside of the threshold value boundary 90, the options are sequentially updated and displayed. That is, a card column constituting options is moved and displayed in the direction of arrangement of the cards, and the cards are updated such that the cards sequentially appear on and disappear out of the display screen. When the operator's facial image 341A is moved and enters the threshold value boundary 90, the movement display of the card column stops, and a card at a predetermined position (for example, substantially the center of the projection image) at that time is highlighted.

The term "movement" or "movement display" of the card group means that the cards being displayed on the display screen are sequentially moved in the direction of an arrow, and a card at the head in the screen disappears out of the screen each time a new card appears on the display screen from the source. Actually, the number of objects for selection as options is finite, and the movement stops after the last card appears due to the movement. Alternatively, the cards may be cyclically circulated so as to sequentially appear again from the head card disappeared out of the screen.

Figure 8A:
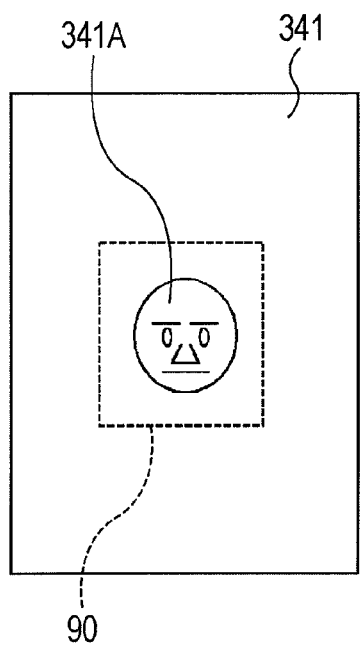
FIGS. 8A and 8B are diagrams showing the position of an operator with respect to an image-capturing section (or display screen) and a display example on the display screen at the present time according to an embodiment of the invention.
Figure 8B:
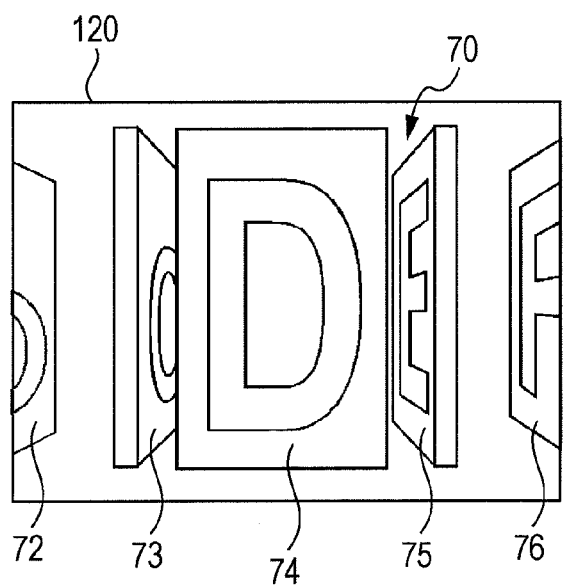

FIGS. 8A and 8B show a case where the operator's facial image 341A is within the threshold value boundary 90, as shown in FIG. 8A. In this case, the card group 70 is arranged as shown in FIG. 7B, and one card is highlighted as shown in FIG. 8B. The term "highlight display" means a display state where the operator recognizes that one specific object for selection from among a plurality of objects for selection is selected. In the example of the drawings, the arrangement is made such that the surface of the card of the object for selection faces the front (operator side). In this case, the card group is not moved. The highlighted card is a card at a predetermined position (for example, the center of the screen) immediately before the card group is moved and displayed.

It is assumed that, from the state of FIG. 8A, the operator relatively moves his/her face left toward the display screen. Then, if the facial image 341A is outside of the threshold value boundary 90, the card group 70 starts to be moved in a predetermined direction. In the example of the drawing, the card group is moved in the direction of arrangement of the cards indicated by an arrow (actually, not displayed on the screen). That is, in this embodiment, the card group is moved in a direction away from the viewpoint of the operator. In contrast, the card group may be moved in a direction toward the viewpoint of the operator.

In this embodiment, the card group is regarded as a three-dimensional object and displayed as a projection image projected on a predetermined projection plane by a method described below when viewed from a specific three-dimensional viewpoint position. Thus, the card group is displayed with perspective.

In terms of the sense of realism, the movement of the card group is made such that the cards are displayed so as to be successively moved in the direction of an arrow on the screen. Alternatively, display may be performed such that each card jumps to the next card position. In this case, it is not necessary to successively move each card at an intermediate position between the cards, so the load for display control is reduced.

FIG. 8B show a state where the operator's facial image is within the threshold value boundary 90, and one object for selection (in the drawing, an object for selection 74) is highlighted. Further, when the operator performs any operation, a function corresponding to the card is executed. Any operation may be performed by detecting a change in the expression of the face or the like on the basis of the facial image in a hands-free manner. Alternatively, the selection operation may be the above-described manual operation to the operating section. The objects for selection 72, 73, 75, and 76 other than the object for selection 74 being selected are three-dimensionally displayed with perspective in accordance with the viewpoint position at that time. Similarly to how the cards are to be visible in the actual arrangement of the cards, the objects for selection 75 and 76 on the right side from the viewpoint are displayed such that the front surfaces thereof are visible, and the objects for selection 72 and 73 on the left side from the viewpoint are displayed such that the rear surfaces thereof are visible. Alternatively, the objects for selection on the left side may be displayed such that the front surfaces thereof are visible.

Figure 9A:
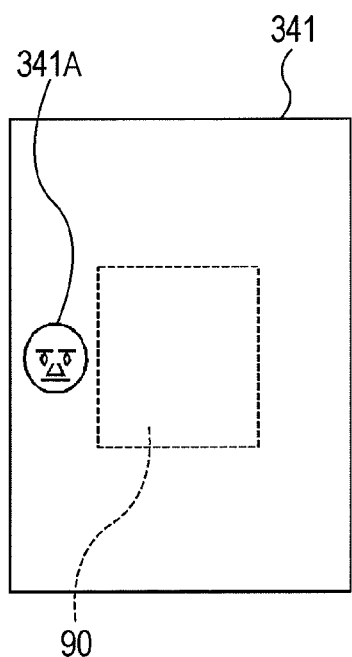
FIGS. 9A and 9B are diagrams showing the position of an operator with respect to an image-capturing section (or display screen) and a display example on the display screen at the present time according to an embodiment of the invention.

When the operator relatively moves his/her face left with respect to the display screen from the state of FIG. 8A, and the facial image is outside of the threshold value boundary 90 as shown in FIG. 9A, the card group returns to the arrangement of FIG. 7A and is three-dimensionally displayed with perspective in accordance with the viewpoint position at that time. Then, the card group is moved so as to flow in the direction of an arrow. At this time, the operator pulls back his/her face (relatively moves his/her face away) from the image-capturing section so as to enlarge the distance from the card group to the viewpoint position. Thus, the number of cards coming into sight increases, and the ability to view at a glance is improved. As described above, the change in the distance from the card group to the viewpoint position can be recognized on the basis of the change in the size of the facial image 341A.

Figure 9B:
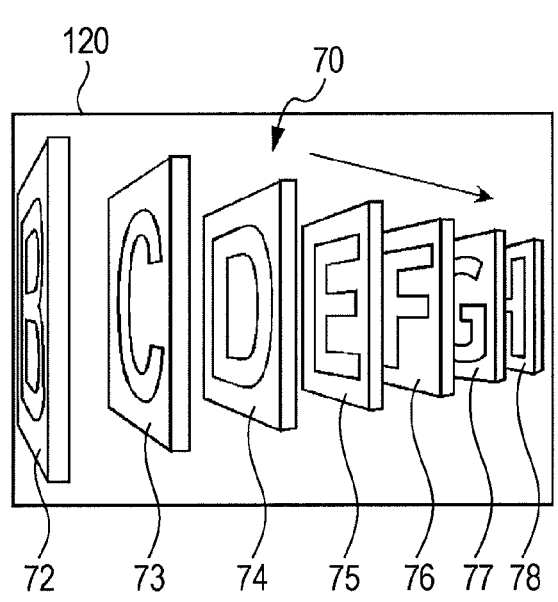
Figure 10A:
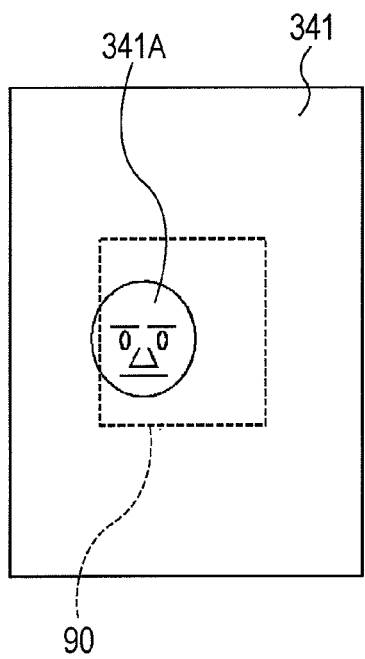
FIGS. 10A and 10B are diagrams showing the position of an operator with respect to an image-capturing section (or display screen) and a display example on the display screen at the present time according to an embodiment of the invention.
Figure 10B:
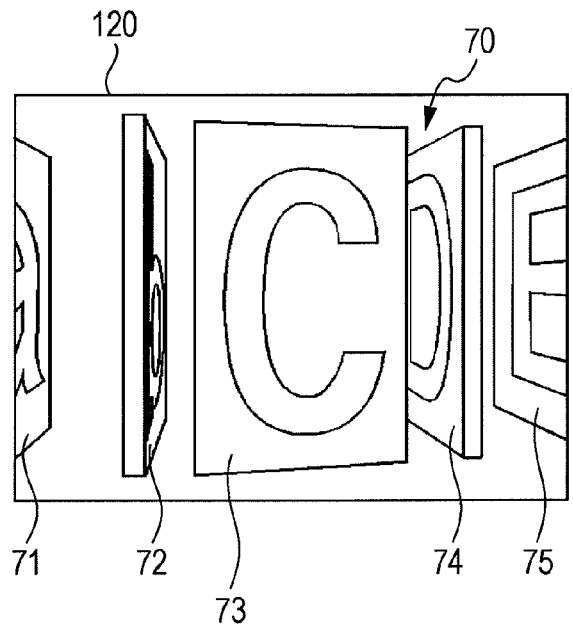

As shown in FIG. 10A, when the facial image is within the threshold value boundary 90 from the state of FIG. 9A, the movement display of the cards stop, and as shown in FIG. 9B, one card (in the example of the drawing, the object for selection 73) at a predetermined position at that time is highlighted. Before highlight display, if the facial image is outside of the threshold value boundary 90 at that time, any identification display may be performed on the card such that the operator can identify the card being highlighted. With regard to the identification display, for example, the frame of the card may be thickened, the color or luminance of the frame or the card may be changed, reversed display may be performed, or the like.

Figure 11A:
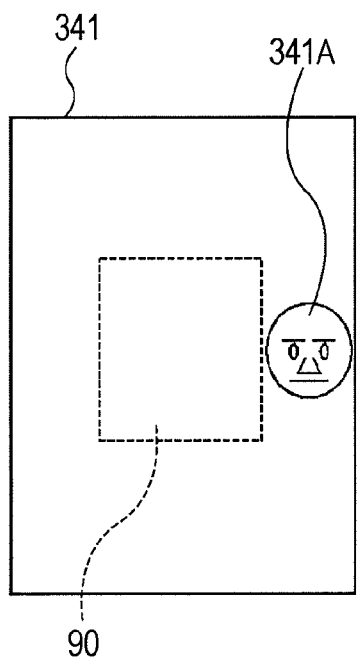
FIGS. 11A and 11B are diagrams showing the position of an operator with respect to an image-capturing section (or display screen) and a display example on the display screen at the present time according to an embodiment of the invention.
Figure 11B:
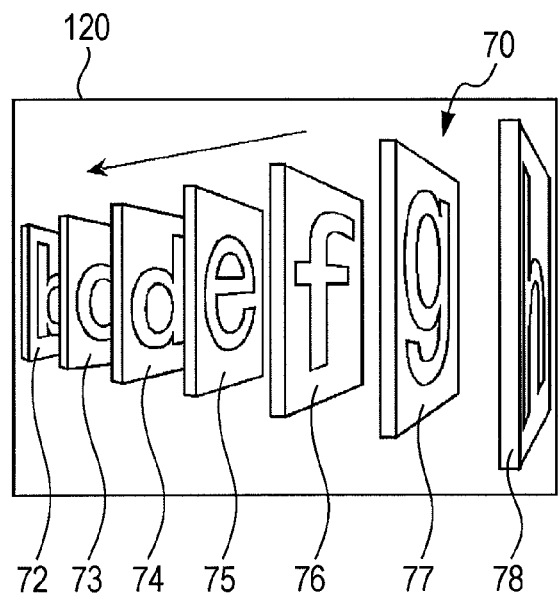

FIGS. 11A and 11B show an example where a card group is moved in the direction of an arrow opposite to the above-described example and displayed. The viewpoint position at this time is in a direction in which the rear surface of the card is visible, so the rear surface of each card is displayed. In this case, configuration may be made such that the front surface of the card is visible.

Figure 12A:
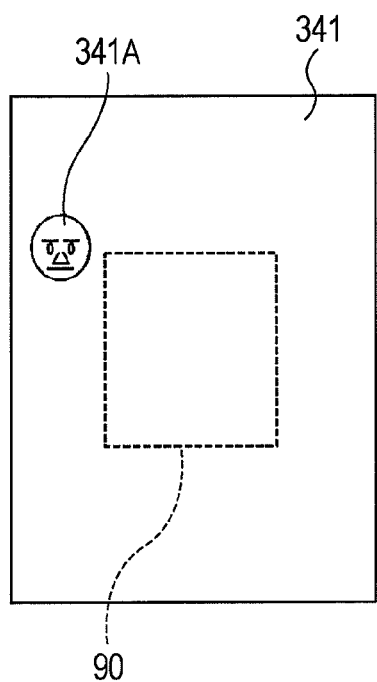
FIGS. 12A and 12B are diagrams showing the position of an operator with respect to an image-capturing section (or display screen) and a display example on the display screen at the present time according to an embodiment of the invention.
Figure 12B:
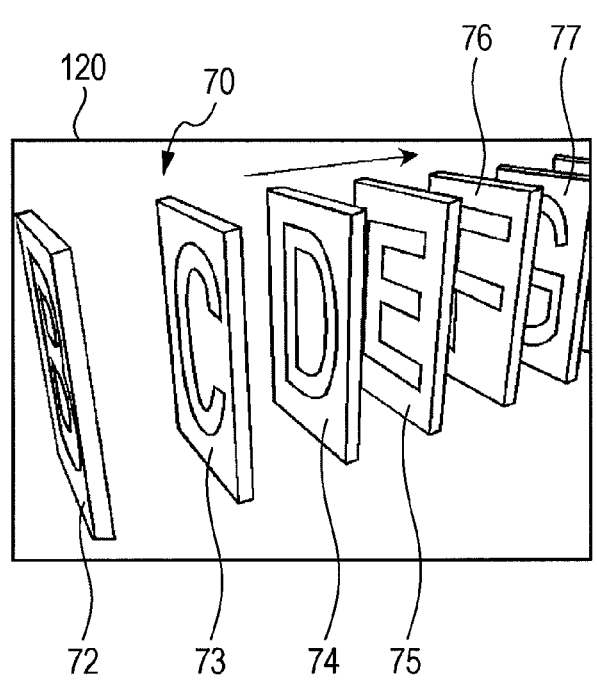

FIGS. 12A and 12B show a case where the operator relatively moves his/her face in an upper left direction with respect to the display screen, and the facial image is outside of the threshold value boundary 90 in the upper left direction. In this case, the viewpoint position is shifted in the upper left direction, so the card group 70 is three-dimensionally displayed when viewed obliquely from the upper left direction, as shown in FIG. 12B. In this case, the card group 70 is moved obliquely in an upper right direction.

FIGS. 13A and 13B show a case where the operator relatively moves his/her face in an upper right direction with respect to the display screen, and the facial image is outside of the threshold value boundary 90 in an upper right direction. At this time, the viewpoint position is shifted in the upper right direction, so the card group 70 is three-dimensionally displayed when viewed obliquely from the upper right direction, as shown in FIG. 13B. In this case, the card group 70 is moved obliquely in the upper left direction.

As shown in FIGS. 12A to 13B, the card group is displayed in parallel in the oblique direction due to the movement of the viewpoint position in the up-down direction, so three-dimensional display becomes more realistic. In some cases, the ability to view the card group at a glance is improved.

The position of the facial image in the up-down direction may be neglected, and the facial image may be moved and displayed only in the left-right direction.

Figure 14A:
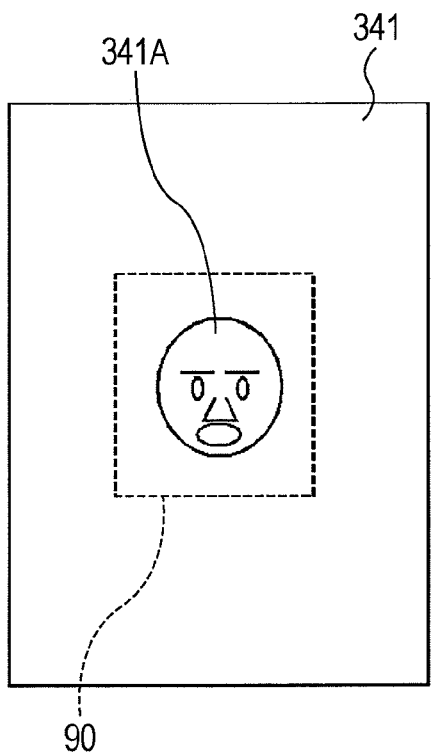
FIGS. 14A and 14B are diagrams showing an example of a change of a facial image according to an embodiment of the invention.
Figure 14B:
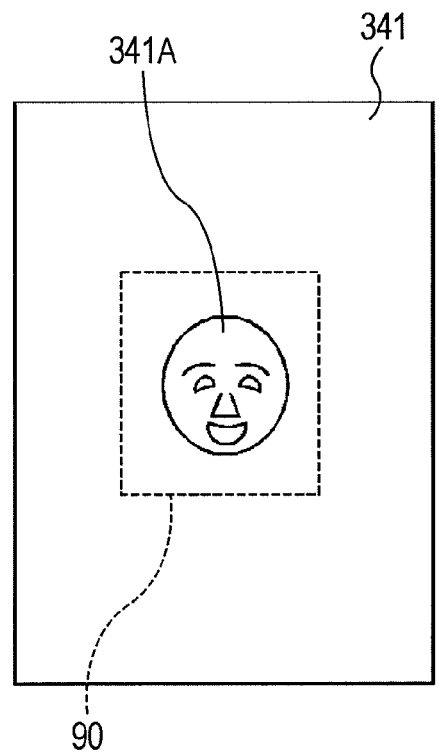

FIGS. 14A and 14B show an example of a change in the facial image. The change in the facial image can be used to execute a function corresponding to an object for selection being highlighted. In this case, a hands-free operation is realized from beginning to end. Such a facial image may include an image in which the operator keeps his/her mouth open, or an image in which the operator is smiling, and may be used together for the above-described operation.

For example, as shown in FIG. 14A, if it is detected that in the operator's facial image 341A, the operator keeps his/her mouth open, the function allocated in advance to the object for selection may be executed. Meanwhile, as shown in FIG. 14B, if it is detected that the operator's facial image 341A is an image in which the operator is smiling, an auxiliary operation menu allocated in advance to the object for selection may be opened. However, this is just an example, a lot of input methods may be provided by determining the open/closed state of the mouth or eyes, the direction or operation of the face other than the open/closed state, or determining the expression of the face, such as a smiling face, a face with tears, an angry face, or the like.

As the effects, the operator can operate an application or the like by an intuitive method, for example, by moving his/her face with respect to the display screen or changing the expression. The three-dimensional viewpoint position can be changed by the same operation, and with three-dimensional display, multiple objects can be intuitively visible at the same time.

Figure 15:
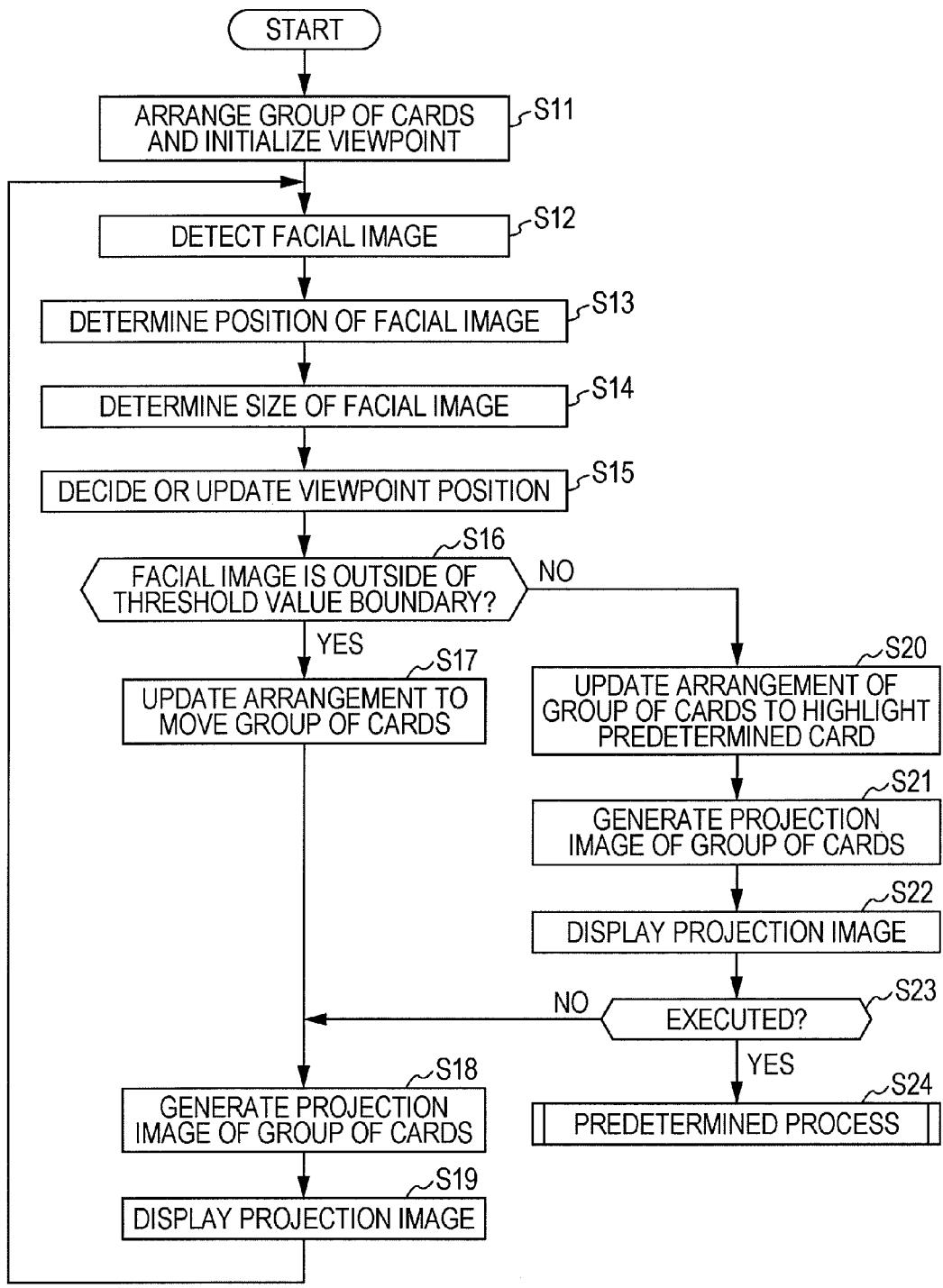
FIG. 15 is a flowchart showing an execution procedure of a main process for realizing an operation according to an embodiment of the invention.

FIG. 15 is a flowchart showing an execution procedure of a main process for realizing the operation of this embodiment. The process is realized when the CPU 101 shown in FIG. 2 reads and executes the display control program stored in the storage section 102. This process may be valid when a specific application for music playback or the like is activated, or may be initially used by the system program of the mobile object terminal.

First, the card group is arranged and the viewpoint is initialized (S11). Initially, it is assumed that the operator is substantially located in front of the display screen, and the facial image is within the threshold value boundary 90. The arrangement of the card group is as shown in FIG. 7B. Even if the arrangement is a shown in FIG. 7A, the arrangement of the card group is immediately corrected by detection of the facial image of the operator, and thus the initial arrangement of the card group is not particularly discussed. The initial viewpoint position is set at a position set in advance in consideration of the general usage of the operator.

The image-capturing section starts to capture an image, and the facial image in the captured image is detected (S12). The position of the facial image with respect to the captured image is determined (S13). The size of the facial image is also determined (S14). The methods of determining the position and size of the facial image are as described above. The viewpoint position is decided and updated in accordance with the obtained position and size of the facial image (S15).

Next, it is determined whether or not the facial image is outside of the threshold value boundary (S16). If the facial image is outside of the threshold value boundary, as shown in FIG. 7A, the arrangement of the card group arranged at regular intervals is updated so as to be moved in the arrangement direction (S17). The projection image of the card group at this time is generated (S18), and is displayed on the display screen (S19).

If the facial image is within the threshold value boundary, as shown in FIG. 7B, the arrangement of the card group is updated such that a predetermined card is highlighted (S20). The projection image of the card group at this time is generated (S21), and is displayed on the display screen (S22). When an instruction to execute the function corresponding to the selected card is made by the operator (S23, Yes), a predetermined process corresponding to the function is executed (S24).

For example, when a specific card is selected from a card group representing CD jackets and an execution instruction is made for the purpose of music playback, a card group representing musical pieces may be displayed for reselection of a group of musical pieces recorded in the CD album. When a piece of music selected from the card group is executed, the piece of music may start to be played.

Figure 16:
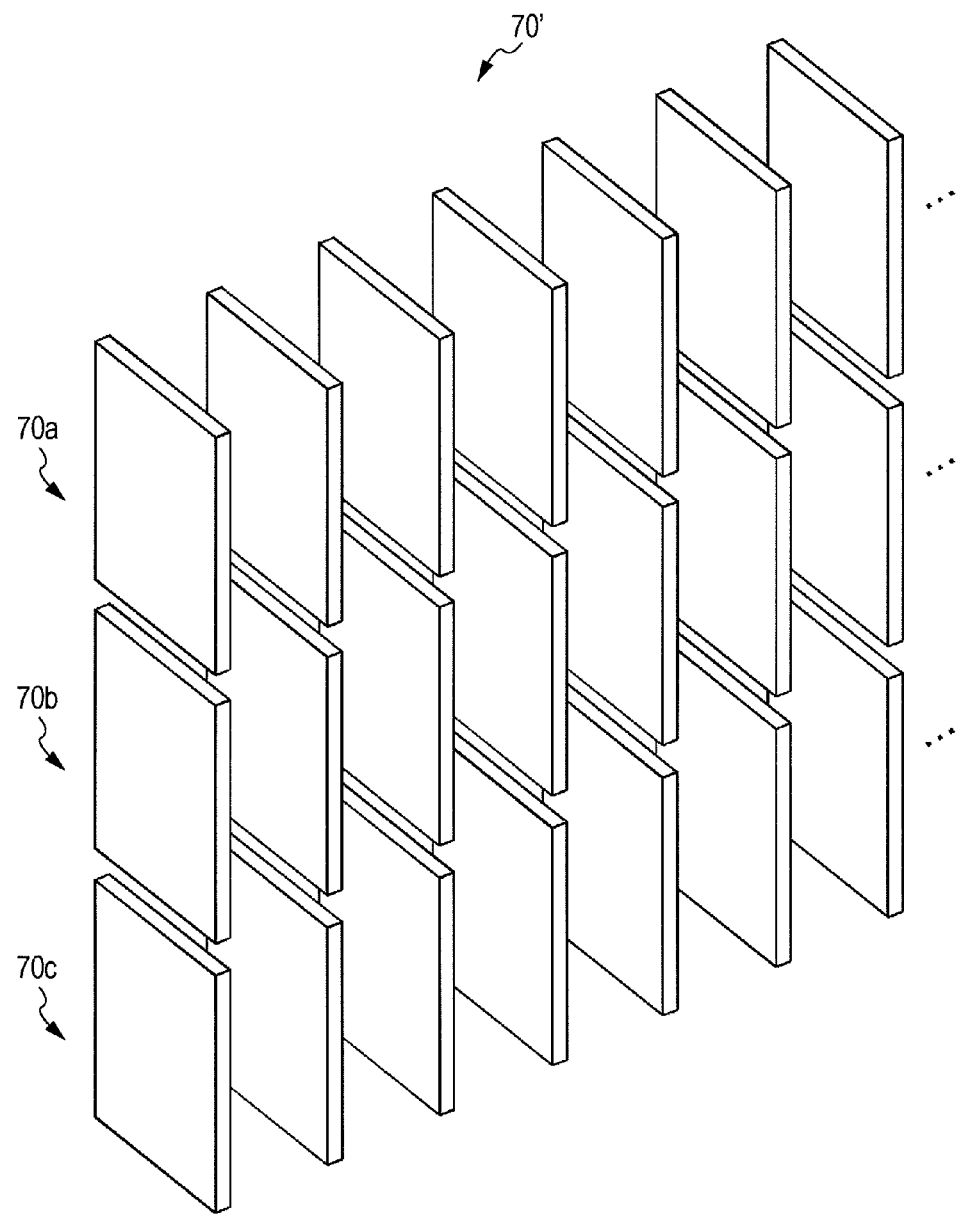
FIG. 16 is a diagram illustrating a modification of an embodiment of the invention.
Figure 17A:
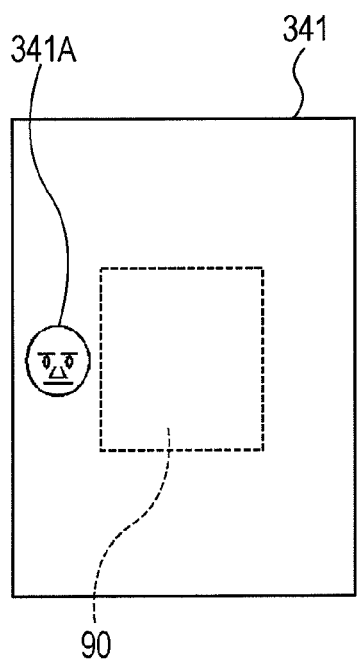
FIGS. 17A and 17B are diagrams showing an example of three-dimensional display of a plurality of card columns corresponding to FIG. 16.
Figure 17B:
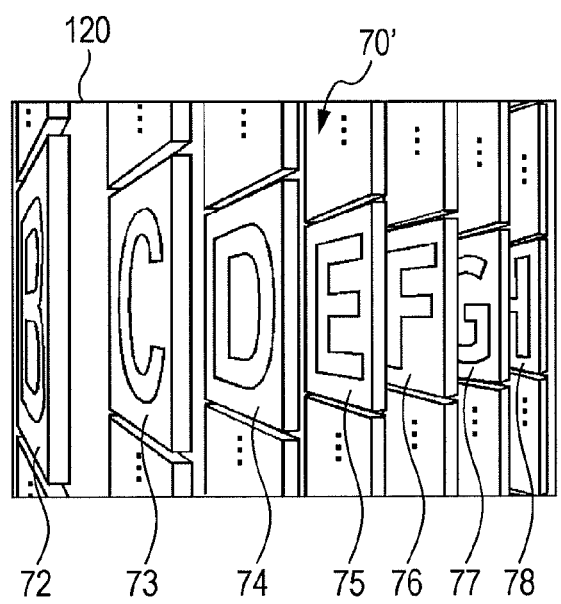

FIG. 16 is a diagram illustrating a modification of this embodiment. The card group shown in FIG. 7A is arranged in one column. However, the card group may be arranged in a plurality of columns so as to be superimposed in multiple stages in the up-down direction. FIG. 16 shows a card group 70' in three columns, but two columns or four or more columns may be provided. In this specification, the card groups in the respective columns are called card columns 70a, 70b, and 70c. In this case, as shown in FIG. 17, three-dimensional display is performed in a plurality of card columns. In the example of the drawing, even if four or more columns are provided, only three columns are mainly shown on the display screen. However, how many columns are visible may be changed in accordance with the viewpoint position. Similarly to the above-described case, the card columns are simultaneously moved and displayed. Meanwhile, only the card column at the center may be moved and displayed.

The selection of the card column is performed by moving the card group 70' in units of a card column when the facial image is outside of the threshold value boundary in the upper direction, and by stopping the movement in the upper direction when the facial image is within the threshold value boundary. Even if the facial image is still outside of the threshold value boundary in the upper direction, when there is no card column that should be displayed, the movement is stopped in a state where the last card column is at the center. Alternatively, the card columns may be cyclically circulated. The same is applied to the lower direction.

When a plurality of card columns superimposed in multiple states are used, if the facial image is not outside of the threshold value boundary in all directions, highlight display is performed at a predetermined position (for example, a card at the substantially center of the card column being displayed at the center). FIGS. 18A and 18B show an example of such highlight display.

As described above, if the card group is arranged in a plurality of columns, the number of cards per column is reduced, and thus it is expected that the substantial time necessary for the operator to find a desired card is reduced. The attribute of the object for selection (for example, a genre in the case of a musical piece) is allocated to each card column, so the selection of the operator can be facilitated.

Figure 19:
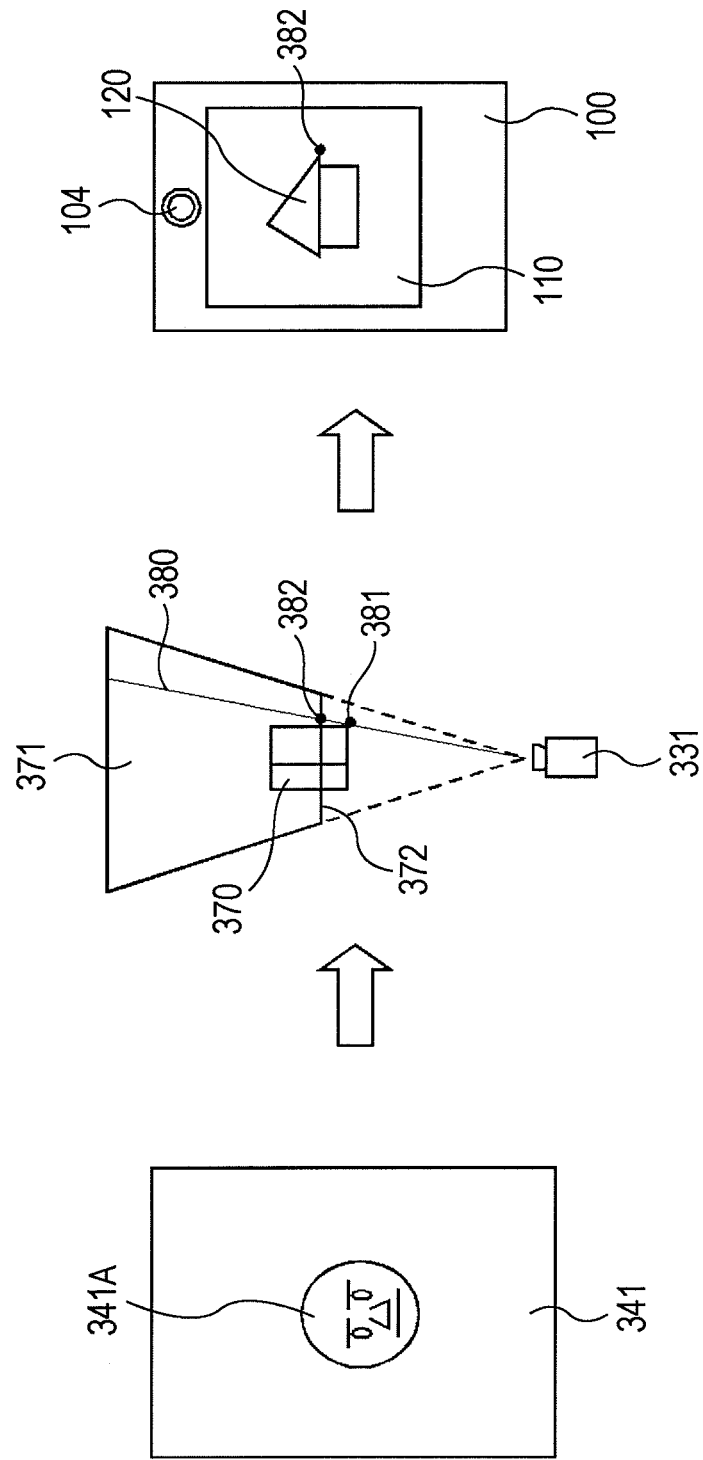
FIG. 19 is an explanatory view of a method of realizing three-dimensional display with perspective by a projection image according to an embodiment of the invention.
Figure 20:
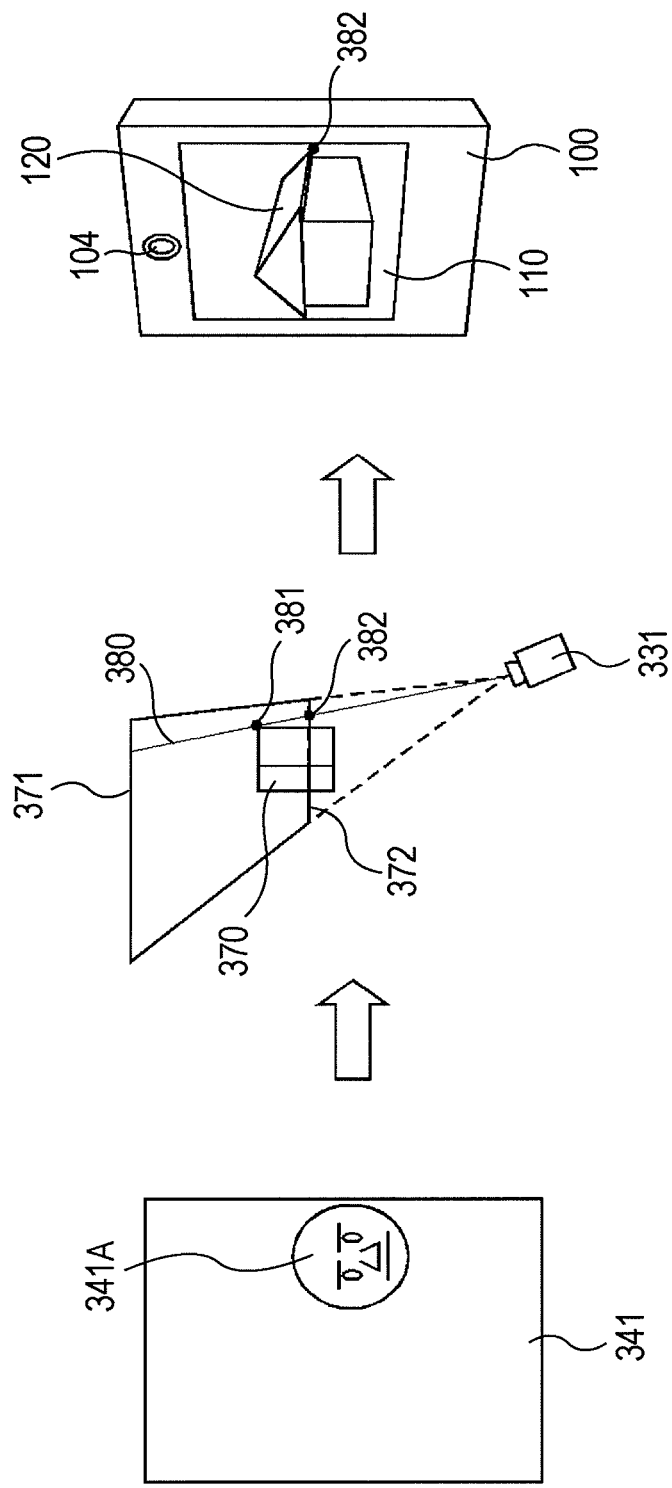
FIG. 20 is an explanatory view of a method of realizing three-dimensional display with perspective by a projection image according to an embodiment of the invention.
Figure 21:
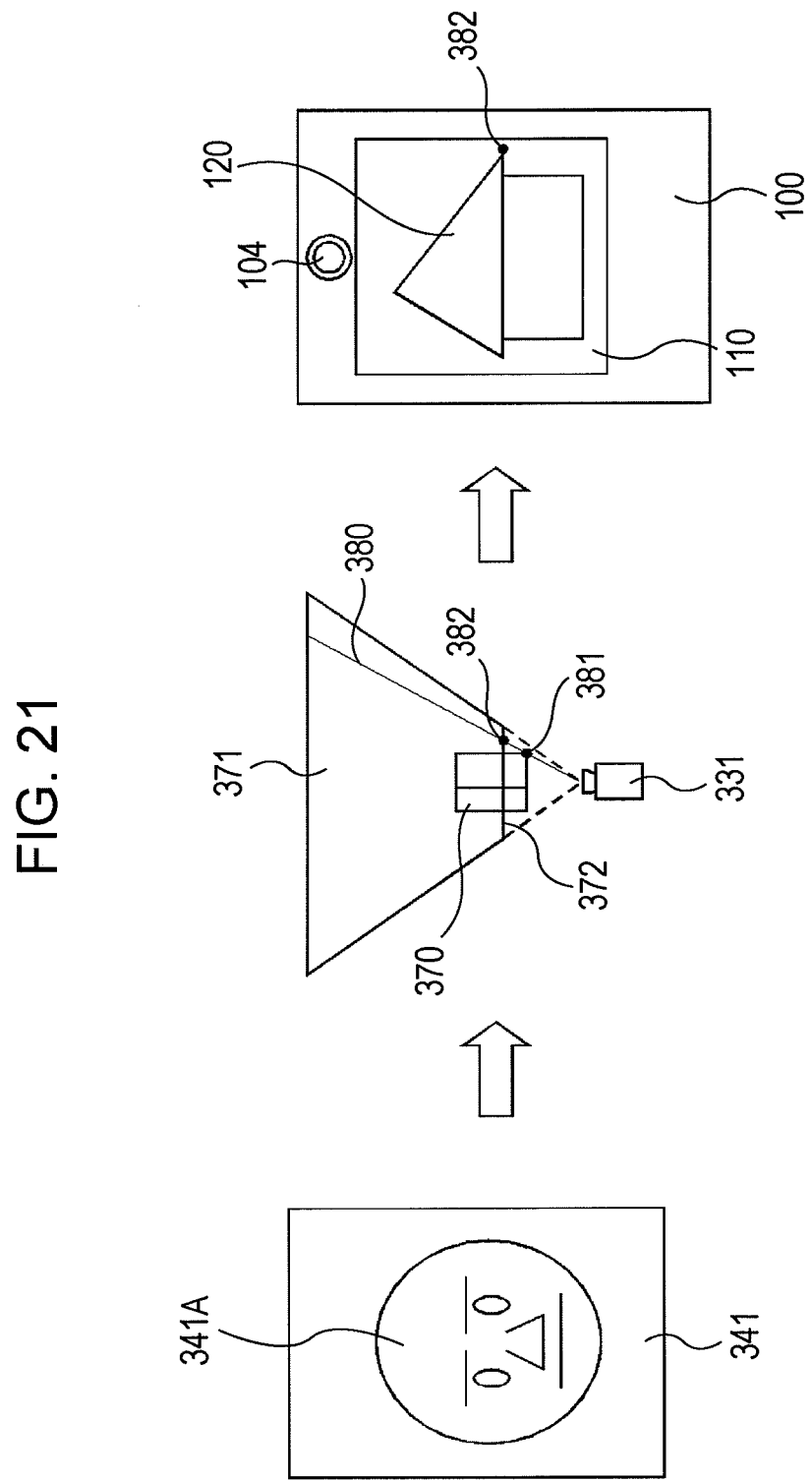
FIG. 21 is an explanatory view of a method of realizing three-dimensional display with perspective by a projection image according to an embodiment of the invention.

A method of realizing three-dimensional display with perspective by the projection image will be described with reference to FIGS. 19 to 21. In FIGS. 19 to 21, the left side shows an example of the captured image 341 and the operator's facial image 341A in the captured image 341. In FIGS. 19 to 21, the central side shows the relationship between a three-dimensional object 370 used in the projection image generation section 312 and a three-dimensional viewpoint position 331 and shows an example of a projection image generation range 371 when viewed from above. In FIGS. 19 to 21, the right side shows an example of the mobile object terminal, the display screen, and a three-dimensional object projection image 120 projected on a projection plane 372 when viewed from the operator.

In this embodiment, the three-dimensional object 370 is a card group arranged as shown in FIGS. 7A and 7B, but for convenience, a house is shown. The three-dimensional object information change section 315 determines the position of the face rectangle by comparison with the threshold value boundary, and updates the arrangement of the card group as the three-dimensional object for movement display and highlight display, if necessary. When the arrangement of the three-dimensional object is changed, three-dimensional display follows the change. Hereinafter, for explanation of three-dimensional display, description will be provided assuming that the three-dimensional object is fixed.

In this embodiment, the three-dimensional viewpoint position 331 is changed in accordance with the change in the operator's facial image 341A. The movement of the three-dimensional viewpoint position 331 with respect to the fixed projection plane 372 causes deformation of the projection image generation range 371, and changes the projection image 120. Specifically, a point 382 where a line 380 connecting the three-dimensional viewpoint position 331 and an arbitrary point 381 of the three-dimensional object 370 crosses the projection plane 372 becomes a display point of the relevant point. Accordingly, a two-dimensional projection image projected on the projection plane 372 is three-dimensionally visible, so the sense of realism can be increased. Although a case where the projection plane 372 is located between the front surface and the rear surface of the three-dimensional object 370 when viewed from the three-dimensional viewpoint position 331 is shown, such a positional relationship is not necessarily provided.

In the example of FIG. 19, the operator's facial image 341A is located at the substantially center of the captured image. The face rectangle detection section 310 generates face rectangle information from the captured image 341. In the example of FIG. 19, the face rectangle information indicates that the face of the operator 10 is located at the substantially center of the display screen.

Next, the three-dimensional object projection viewpoint calculation section 311 can determine on the basis of the face rectangle information that the operator is located in front of the mobile object terminal. Then, the three-dimensional object projection viewpoint calculation section 311 calculates the three-dimensional viewpoint position 331 from the relative size of the face size with respect to the captured image, and decides the shape and position of the projection image generation range 371 on the basis of the three-dimensional viewpoint position 331.

The projection image generation section 312 changes the three-dimensional viewpoint position 331 such that the three-dimensional viewpoint position 331 follows the movement of the face of the operator along the display screen. The projection image generation section 312 changes the three-dimensional viewpoint position 331 such that the distance from the three-dimensional object to the three-dimensional viewpoint position 331 is changed in accordance with the size of the facial image with respect to the captured image.

An inverted trapezoid on the central side of FIG. 19 is the projection image generation range 371. The lower side of the trapezoid is fixed so as to be aligned with the region projected on the projection plane 372, and the projection image generation range 371 is decided from the lower side and the three-dimensional viewpoint position 331. The central side of FIG. 19 shows an example of the horizontal direction when viewed from above, the same calculation is executed for the vertical direction, and the projection image generation range 371 having a truncated four-sided pyramid shape is calculated.

Next, the projection image generation section 312 generates the three-dimensional object projection image 120 on the basis of the projection image generation range 371 and the three-dimensional object information 361.

Finally, the projection image display instruction section 313 instructs the display section 103 to display the generated three-dimensional object projection image 120. As a result, display is performed as the display screen 110 on the right side of FIG. 19.

In the example of FIG. 20, the operator's facial image 341A is located at the right end in the captured image. The face rectangle detection section 310 generates face rectangle information on the basis of the captured image 341. In FIG. 20, the face rectangle information indicates that the face of the operator 10 is located on the right side with respect to the display screen.

Next, the three-dimensional object projection viewpoint calculation section 311 can determine on the basis of the face rectangle information that the operator is located on the right side of the mobile object terminal. Then, the three-dimensional object projection viewpoint calculation section 311 calculates the three-dimensional viewpoint position from the relative size of the face size with respect to the captured image, and decides the shape and position of the image generation range 371 on the basis of the three-dimensional viewpoint position.

By comparison with FIG. 19, a change in the position of the operator's facial image 341A causes a change in the three-dimensional viewpoint position, and the projection image generation range 371 is decided as an inverted trapezoid having a common lower side, as shown on the central side of FIG. 20. When the operator's facial image 341A is moved in the vertical direction as well as the horizontal direction, an inverted trapezoid is calculated for the vertical direction in the same manner, and a truncated four-sided pyramid obtained by combining the inverted trapezoids in the horizontal direction and the vertical direction is decided as the projection image generation range 371.

Next, the projection image generation section 312 generates the three-dimensional object projection image 120 on the basis of the projection image generation range 371 and the three-dimensional object information 361.

Finally, the projection image display instruction section 313 instructs the display section 103 to display the generated three-dimensional object projection image 120. As a result, display is performed as the display screen 110 on the right side of FIG. 20.

In the example of FIG. 21, the operator's facial image 341A is located at the substantially center of the captured image, but by comparison with FIG. 19, the operator's facial image 341A occupies a relatively large area. The face rectangle detection section 310 generates face rectangle information from the captured image 341. In FIG. 21, the face rectangle information indicates the center. The three-dimensional object projection viewpoint calculation section 311 can determine on the basis of the face rectangle information substantially indicating the center that the operator is located in front of the mobile object terminal. Then, the three-dimensional object projection viewpoint calculation section 311 calculates the three-dimensional viewpoint position from the relative size of the face size with respect to the captured image, and decides the shape and position of the projection image generation range 371 on the basis of the three-dimensional viewpoint position. As shown on the central side of FIG. 21, by comparison with the central side of FIG. 19, the three-dimensional viewpoint position is changed in the upper direction of the drawing. As a result, the projection image generation range 371 obtained by the three-dimensional viewpoint position and the fixed lower side has a trapezoidal shape which is widened upward. A trapezoid is calculated for the vertical direction in the same manner, and a truncated four-sided pyramid obtained by combining the trapezoids in the horizontal direction and the vertical direction is decided as the projection image generation range 371. The projection image generation section 312 generates the three-dimensional object projection image 120 on the basis of the projection image generation range 371 and the three-dimensional object information 361. Finally, the projection image display instruction section 313 instructs the display section 103 to display the generated three-dimensional object projection image 120. As a result, display is performed as the display screen 110 on the right side of FIG. 21.

As described above, if the face approaches, the display size of the projection image of the three-dimensional object increases, and details are easily visible. If the face is pulled back (becomes distant), details are hard to see, but more objects for selection can be displayed in the surface. Thus, the ability to view at a glance becomes good. The operator can realize such operations only by relatively changing the face position with respect to the mobile object terminal 100.

As a modification of movement display, when the facial image is outside of the threshold value boundary 90, the speed of movement and update of the card group may be variably controlled in accordance with the position or size of the facial image. For example, when the facial image is outside of the threshold value boundary 90, control may be performed such that the further the position of the facial image is outside of the threshold value boundary 90, the more the speed of movement for movement display increases. Alternatively, when the facial image is outside of the threshold value boundary 90, control may be performed such that the smaller the size of the facial image is, the more the speed of movement for movement display increases.

With the three-dimensional display based on the facial image of this embodiment, a display image with perspective of a three-dimensional object can be obtained by projecting the three-dimensional object on a two-dimensional display screen without using a special device or tool other than the mobile object terminal including the image-capturing section 104, so the sense of realism can be provided to the operator. In calculating the three-dimensional viewpoint position, only the relative position of the face position of the operator (consequently, the facial image) with respect to the image-capturing section 104 (consequently, a captured image) is used, so even if the posture of the operator is changed, the three-dimensional viewpoint position can be used in the same manner. Further, the captured image 341 is successively acquired from the image-capturing section 104, and the face position of the operator continues to be reflected in the projection image. Therefore, a feedback of the positional relationship between the face of the operator himself/herself and the image-capturing section 104 is provided, so the viewpoint operation can be facilitated.

Although the preferred embodiment of the invention has been described, various modifications and changes may be made.

In the foregoing description, a case where the lens of the image-capturing section is positioned at the upper portion of the display screen in a state the rectangular display screen is vertically long has been described. However, a lens may be positioned at the lateral portion of the display screen in a state the display screen is horizontally long. In this case, the face position may be corrected in accordance with the amount of misalignment of the center of the display screen 110 and the image-capturing section 104, in the same manner as described above.

Although in the foregoing description, it is assumed that a mobile phone terminal is used as a mobile object terminal, a terminal having no telephone function may be used. For example, the invention may be applied to a mobile object terminal having a display screen, such as a PDA, a game machine, a compact PC, or the like. Further, it is preferable that a mobile object terminal is a portable mobile object terminal, but the invention is not limited to the portable type.

A computer program for realizing the function described in the foregoing embodiment and a computer-readable recording medium having a program recorded thereon fall within the scope of the invention. Examples of the "recording medium" for supplying programs include, for example, a magnetic recording medium (a flexible disk, a hard disk, a magnetic tape, or the like), an optical disk (a magneto-optical disk, such as an MO, a PD, or the like, a CD-ROM, a CD-R, a CD-RW, a DVD-ROM, a DVD-RAM, a DVD+R, a DVD-R, a DVD-RW, a DVD+RW, or the like), a semiconductor storage, a paper tape, and the like.

The present application contains subject matter related to that disclosed in Japanese Priority Patent Application JP 2008-310672 filed in the Japan Patent Office on Dec. 5, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal apparatus comprising:
    display means for displaying a plurality of display elements representing selection options on a display screen, the plurality of display elements being three-dimensionally displayed with perspective relative to a view point of an operator;
    image-capturing means for capturing an image of the operator who is viewing the display screen;
    face position detection means for detecting a position of a facial image of the operator in a captured image; and
    control means (a) for controlling the display means, when the position of the facial image in the captured image is detected to be outside of a predetermined range, to move the plurality of display elements in a predetermined direction on the display screen and to sequentially change the arrangement of the display elements and display the display elements with perspective as a three-dimensional image, and (b) for controlling the display means to simultaneously (1) stop movement of the plurality of display elements when the position of the facial image in the captured image is detected to fall within the predetermined range and (2) select a display element at a predetermined position.

2. The terminal apparatus according to claim 1,
    wherein, when stopping the movement of the display elements, the control means highlights the display element at the predetermined position at the present time.

3. The terminal apparatus according to claim 2,
    wherein the display elements are expressed by a plurality of cards of the same size having a front surface and a rear surface, and the control means displays the plurality of cards as a card group arranged in parallel at regular intervals in a three-dimensional space in perspective view from a viewpoint where at least a part of one surface of each card of the plurality of cards is visible.

4. The terminal apparatus according to claim 3,
    wherein the highlight is made such that one surface of a card corresponding to a display element at the predetermined position from among the plurality of cards is displayed so as to face the front.

5. The terminal apparatus according to claim 3,
    wherein the control means switches the surface visible to the operator to the front surface or the rear surface of a card in accordance with whether the facial image exists on one side or the other side of the predetermined range.

6. The terminal apparatus according to claim 3,
    wherein the control means changes the distance between the viewpoint and the card group in accordance with a size of the facial image.

7. The terminal apparatus according to claim 1,
    wherein the control means displays a projection image projected on a virtual projection plane facing the operator.

8. The terminal apparatus according to claim 1,
wherein a card group serving as the plurality of display elements in a three-dimensional space is arranged in a plurality of columns, and the control means moves at least one card column in a horizontal direction in accordance with a movement of the facial image in a horizontal direction and selects a card column in accordance with the movement of the facial image in a vertical direction.

9. The terminal apparatus according to claim 8,
wherein a movement of the selected card column in the vertical direction and an update of the selected card column are performed in accordance with a position of the facial image.

10. The terminal apparatus according to claim 1,
wherein, when the facial image is outside of the predetermined range, the control means variably controls a speed of movement and an update of the display elements in accordance with a position or a size of the facial image.

11. A display control method for a terminal apparatus including a display section displaying a plurality of display elements representing selection options on a display screen, the plurality of display elements being three-dimensionally displayed with perspective relative to a view point of an operator, and an image-capturing section capturing an image of the operator who is viewing the display screen, the method comprising the steps of:
  detecting a position of a facial image of the operator in an image captured by the image-capturing section;
  determining whether or not the facial image of the operator in the captured image is outside of a predetermined range;
  when it is detected that the position of the facial image in the captured image is outside of the predetermined range, moving the plurality of display elements in a predetermined direction on the display screen, and sequentially changing the arrangement of the display elements and displaying the display elements with perspective as a three-dimensional image; and
  when it is detected that the position of the facial image in the captured image fails within the predetermined range, controlling the display section to simultaneously (1) stop movement of the plurality of display elements and (2) select a display element at a specific position at the present time.

12. A display control program product embodied on a non-transitory computer readable medium which is executed by a terminal apparatus including a display section displaying a plurality of display elements representing selection options on a display screen, the plurality of display elements being three-dimensionally displayed with perspective relative to a view point of an operator, and an image-capturing section capturing the image of an operator who is viewing the display screen, the program product causing a computer to execute the steps of:
  detecting a position of a facial image of the operator in an image captured by the image capturing section;
  determining whether or not the facial image of the operator in the captured image is outside of a predetermined range;
  when it is detected that the position of the facial image in the captured image is outside of the predetermined range, moving the plurality of display elements in a predetermined direction on the display screen, and sequentially changing the arrangement of the display elements and displaying the display elements with perspective as a three-dimensional image; and
  when it is detected that the position of the facial image in the captured image falls within the predetermined range, controlling the display section to simultaneously (1) stop movement of the plurality of display elements and (2) select a display element at a specific position at the present time.

13. A terminal apparatus comprising:
  a display displaying a plurality of display elements representing selection options on a display screen, the plurality of display elements being three-dimensionally displayed with perspective relative to a view point of an operator;
  an image-capturing section capturing an image of the operator who is viewing the display screen;
  a face position detector detecting a position of a facial image of the operator in a captured image; and
  a controller (a) controlling the display, when the position of the facial image of the operator in the captured image is detected to be outside of a predetermined range, to move the plurality of display elements in a predetermined direction on the display screen and to sequentially change the arrangement of the display elements and display the display elements with perspective as a three-dimensional image, and (b) controlling the display to simultaneously (1) stop movement of the plurality of display elements when the position of the facial image in the captured image is detected to fail within the predetermined range and (2) select a display element of a predetermined position.

* * * * *